Patented Nov. 2, 1943

2,333,420

UNITED STATES PATENT OFFICE 2,333,420

ARTIFICIAL DISPERSION OF RUBBER

Donald E. Fowler, Naugatuck, Conn., assignor, by mesne assignments, to Dispersions Process, Inc., New York, N. Y., a corporation of Delaware No Drawing. Application October 19, 1940, Serial No. 361,904

8 Claims. (Cl. 260—760)

This invention relates to artificial dispersions of rubber, and more particularly to artificial dispersions of rubber containing a soap, ammonium ions, and zinc oxide, as for example, artificial dispersions of reclaimed rubber on ammonium soap.

Artificial dispersions of rubber where the rubber particles are dispersed by means of soaps are well known. Where it is desired to produce such a dispersion where dried films of the same will leave no water soluble or water absorptive residues from the dispersing agent, an ammonium or other volatile base soap may be used. While ammonium soaps as dispersing agents give a dispersion from which the ammonia will be volatilized on drying of the film and leave an insoluble fatty acid, this type of dispersion is generically unsatisfactory in the case of reclaimed rubber because of instability due to the formation of destabilizing zinc ammonium complex ions by reaction of the ammonium soap and zinc oxide in the reclaimed rubber.

The present invention relates to the production of stable artificial dispersions of reclaimed rubber containing a soap, ammonium ions, and zinc oxide, as for example, dispersions of reclaimed rubber on ammonium soap.

According to the present invention, a water-soluble sulphide is incorporated in the reclaimed rubber dispersion containing the soap, ammonia ions and zinc oxide, either during its preparation or shortly thereafter. The incorporation of the water-soluble sulphide in the dispersion prevents the destabilizing action of the zinc oxide in the presence of the ammonium ions and permits storing of the dispersions over long periods of time. Where it is desired not to add a sulphide which will leave a water soluble or water absorptive residue in a dried film of the dispersion, volatile base sulphides should be used, for example, ammonium sulphide, ammonium polysulphide, methylamine sulphide, dimethylamine sulphide, trimethylamine sulphide, diethylamine sulphide and the like. Where the introduction of a sulphide that will leave a water soluble or water absorptive residue in a dried film of the latex is not objectionable, sodium or potassium sulphide may be used. The amount of sulphide added may be chemically equivalent to the zinc oxide present in the dispersion, in which case a sufficient amount of sulphide would be added to metathetically react with all the zinc oxide present, presumably to form an insoluble zinc sulphide and thus prevent formation of destabilizing zinc-ammonium complex ions. It has been found, however, that reclaimed dispersions on soap may be stabilized with much smaller amounts of sulphide than the chemical equivalent of the zinc oxide, an amount less than one-half the equivalent amount of zinc oxide being amply sufficient to stabilize the dispersion. The term "sulphide" is used herein to include monosulphides, polysulphides. Selenides and tellurides are equivalent to sulphides in the present invention.

In carrying out the present invention, the reclaimed rubber, with or without the addition of crude rubber, or mixtures of the same with non-rubber materials, such as resins, fillers, and the like, is dispersed by adding water to a plasticized mass of the same until an inversion of phase takes place and the rubber becomes dispersed in the aqueous medium. The water soluble sulphide is incorporated at any time during the preparation of the dispersion, or it may be added shortly thereafter, before the zinc oxide has had sufficient time to form zinc-ammonium complex ions and destabilize the dispersion. In preparing the stable dispersion according to the present invention, the rubber is generally first plasticized on an open mill, and the batch then transferred to an internal mixer of the Werner & Pfleiderer type where it is dispersed by the addition of water thereto. Fillers and compounding ingredients may be added on the mill or in the mixer at any point during the process. The ammonium soap may be added to the plasticized mass on the mill or in the internal mixer. Water is added in the mixer until an inversion of phase takes place and the rubber particles become dispersed in the aqueous medium, after which additional water may be added to the desired concentration of rubber in the dispersion. The soap may be formed in situ by the separate addition to the plasticized stock of the fatty acid and the ammonia, or the soap may be previously prepared and added as such to the plasticized mass.

As an example of carrying out the invention, 100 parts by weight of red tube reclaim containing 3.8% of zinc oxide was plasticized on an open rubber mill until soft and easily workable, and was then transferred to an internal dough mixer (Werner & Pfleiderer), where 2 parts by weight of linoleic acid were added and thoroughly worked in. A small amount of water was slowly worked into the batch until the material in the mixer contained about 13% of water, after which 3.6 parts by weight of 29% aqueous ammonia was added to form the ammonium linoleate in situ. A change in phase took place and the rubber became dispersed in the water, after which 6.5 parts by weight of 17% ammonium mono sulphide was added and further water to a dilution of 50% total solids. A similar compound was dispersed without the addition of the ammonium sulphide and when fresh both solutions were satisfactory. After standing, the dispersion which did not contain ammonium sulphide thickened very rapidly and coagulated within a few hours, whereas the dispersion containing the ammonium sulphide was stable even after a matter of months.

As another example of the preparation of an artificial dispersion of rubber according to the present invention, 100 parts by weight of whole tire reclaim containing 5.5% zinc oxide was plasticized on a mill and transferred to a Werner & Pfleiderer mixer, where 2 parts of oleic acid were added and thoroughly worked in. After addition of a small amount of water, 2 parts by weight of sulphur, 1 part by weight of antioxidant, 1 part by weight of accelerator, were added followed by 7.2 parts of 13% aqueous ammonia, and 1 part by weight of sodium hydrogen sulphide dihydrate ($NaHS.2H_2O$) solution. An inversion of phase took place and further water was added to 50% total solids content. This dispersion was stable and satisfactory on standing for extended periods of time.

As another example of the preparation of an artificial dispersion of reclaimed rubber according to the present invention, 100 parts by weight of red tube reclaim containing 3.4% of zinc oxide were plasticized on an open mill, transferred to a Werner & Pfleiderer mixer, where 4 parts of linoleic acid were added and thoroughly worked in. 2 parts by weight of accelerator, .5 part by weight of antioxidant, 65 parts by weight of hard coumarone resin, and 15 parts by weight of ester gum were added to the plasticized rubber in the dough mixer in the above order. A small amount of water was then added followed by 9 parts of a 15% ammonia solution. An inversion of phase took place, whereupon 5 parts by weight of 19.4% aqueous ammonium polysulphide were added, followed by addition of water to a total solids content of 65%. This dispersion was stable for long periods of time.

As another example of the preparation of an artificial dispersion of reclaimed rubber according to the present invention, 100 parts by weight of whole tire reclaim containing 5.5% of zinc oxide were plasticized on a mill and 100 parts by weight of whiting were thoroughly mixed in. The mass was transferred to a Werner & Pfleiderer internal dough mixer where 6 parts by weight of oleic acid were added. A small amount of water was added followed by 20 parts by weight of 14% aqueous ammonia. An inversion of phase took place, and further dilution was obtained to 60% total solids. 10 parts by weight of 17% of ammonium sulphide solution was then added. This dispersion was stable for a considerable period of time, whereas a dispersion similarly made without the addition of the ammonium sulphide solution became unstable and coagulated in a relatively short time.

Artificial dispersions made according to the present invention may be used as such or mixed with natural rubber latices in various processes where it is desired to have the rubber in the form of a dispersion in an aqueous medium.

In view of the many changes and modifications that may be made without departing from the principles underlying the invention, reference should be made to the appended claims for an understanding of the scope of the invention.

Having thus described my invention, what I claim and desire to protect by Letters Patent is:

1. The process of preparing an artificial dispersion of rubber which comprises adding water to a plasticized reclaimed rubber mass containing zinc oxide and an ammonium soap until an inversion of phase takes place and the rubber becomes dispersed in the aqueous medium, and adding an amount of a water-soluble basic sulphide which will react with sufficient of the zinc oxide to form insoluble zinc sulphide to prevent formation of such amount of zinc ammonium complex as would destabilize the dispersion.

2. The process of preparing an artificial dispersion of rubber which comprises adding water to a plasticized reclaimed rubber mass containing zinc oxide and an ammonium soap until an inversion of phase takes place and the rubber becomes dispersed in the aqueous medium, and adding an amount of a water-soluble volatile-base sulphide which will react with sufficient of the zinc oxide to form insoluble zinc sulphide to prevent formation of such amount of zinc ammonium complex as would destabilize the dispersion.

3. An artificial aqueous dispersion of zinc oxide containing reclaimed rubber, said dispersion containing an ammonium soap, and having a sufficient quantity of said zinc oxide reacted with a water-soluble basic sulphide to form insoluble zinc sulphide to prevent formation of such amount of zinc ammonium complex as would destabilize the dispersion.

4. An artificial aqueous dispersion of zinc oxide containing reclaimed rubber, said dispersion containing an ammonium soap, and having a sufficient quantity of said zinc oxide reacted with a water-soluble volatile base sulphide to form insoluble zinc sulphide to prevent formation of such amount of zinc ammonium complex as would destabilize the dispersion.

5. An artificial aqueous dispersion of zinc oxide containing reclaimed rubber, said dispersion containing an ammonium soap, and having a sufficient quantity of said zinc oxide reacted with a water-soluble basic sulphide, the sulphide being present in amount not greater than the chemical equivalent of the zinc oxide content of the reclaimed rubber.

6. An artificial aqueous dispersion of zinc oxide containing reclaimed rubber, said dispersion containing an ammonium soap, and having a sufficient quantity of said zinc oxide reacted with a water-soluble volatile base sulphide, the sulphide being present in amount not greater than the chemical equivalent of the zinc oxide content of the reclaimed rubber.

7. An artificial aqueous dispersion of zinc oxide containing reclaimed rubber, said dispersion containing an ammonium soap, and having a sufficient quantity of said zinc oxide reacted with a water-soluble basic sulphide, the sulphide being present in amount less than one-half the chemical equivalent of the zinc oxide content of the reclaimed rubber.

8. An artificial aqueous dispersion of zinc oxide containing reclaimed rubber, said dispersion containing an ammonium soap, and having a sufficient quantity of said zinc oxide reacted with a water-soluble volatile base sulphide, the sulphide being present in amount less than one-half the chemical equivalent of the zinc oxide content of the reclaimed rubber.

DONALD E. FOWLER.